United States Patent
Brackhagen et al.

(10) Patent No.: US 8,138,331 B2
(45) Date of Patent: *Mar. 20, 2012

(54) WATER-DISPERSIBLE POLYSACCHARIDE DERIVATIVES OF REDUCED GLYOXAL CONTENT, AND A PROCESS FOR DECREASING THE GLYOXAL CONTENT IN GLYOXAL-CROSSLINKED POLYSACCHARIDE DERIVATIVES

(75) Inventors: Meinolf Brackhagen, Walsrode (DE); Hartwig Schlesiger, Bad Fallingbostel (DE)

(73) Assignee: Dow Global Technologies LLC, Midland, MI (US)

( * ) Notice: Subject to any disclaimer, the term of this patent is extended or adjusted under 35 U.S.C. 154(b) by 243 days.

This patent is subject to a terminal disclaimer.

(21) Appl. No.: 11/591,654

(22) Filed: Nov. 1, 2006

(65) Prior Publication Data

US 2007/0055057 A1    Mar. 8, 2007

Related U.S. Application Data

(62) Division of application No. 10/781,230, filed on Feb. 19, 2004, now abandoned.

(30) Foreign Application Priority Data

Feb. 26, 2003  (DE) .................. 103 08 109

(51) Int. Cl.
 *C07H 1/00* (2006.01)
(52) U.S. Cl. .............. 536/124; 536/85; 536/86; 536/90; 536/91; 536/95; 536/96
(58) Field of Classification Search ............ 536/85, 536/86, 90, 91, 95, 96, 124
See application file for complete search history.

(56) References Cited

U.S. PATENT DOCUMENTS

| | | | |
|---|---|---|---|
| 2,879,268 A | 3/1959 | Jullander | 260/232 |
| 3,297,583 A | 1/1967 | Dierichs et al. | 252/363.5 |
| 3,356,519 A * | 12/1967 | Chambers et al. | 106/175.1 |
| 4,041,234 A | 8/1977 | Maske | 536/114 |
| 4,400,502 A | 8/1983 | Majewicz | 536/87 |
| 4,472,167 A * | 9/1984 | Welch | 8/116.4 |
| 4,889,562 A * | 12/1989 | Bugnon et al. | 106/176.1 |
| 5,837,864 A * | 11/1998 | Andersson et al. | 536/124 |
| 7,012,139 B2 * | 3/2006 | Schlesiger et al. | 536/85 |
| 2003/0097962 A1 | 5/2003 | Hild et al. | 106/162.81 |

FOREIGN PATENT DOCUMENTS

| | | |
|---|---|---|
| DE | 1 518 213 | 5/1969 |
| DE | 1 719 445 | 6/1970 |
| GB | 1 465 934 | 3/1977 |

OTHER PUBLICATIONS

Ullmann's Encyclopedia of Industrial Chemistry, vol. 5, revised 5$^{th}$ edition (month unavailable) 1986, chapter 3.2.5, pp. 461, 472-473, Lothar Brandt et al, "Cellulose Ethers".
Recl. Tray. Chim. Pays-Bas. 109, Jul./Aug. 1990, pp. 419-424, Farid Hamedi Sangsari et al, "Competitive hemiacetalization and acetalization: cross-linking of cellulose by glyoxal".
Analytical Chemistry, vol. 34 (4), Apr. 1962, pp. 505-508, Eugene Sawicki et al, "A Comparison of Methods for Spot Test Detection and Spectrophotometric Determination of Glyoxal".
Cefic, Cellulose ether group, Sep. 2002, "Method for the determination of glyoxal content in cellulose ethers".
Ind. Eng. Chem. Anal. Ed. 18, (month unavailable) 1946, pp. 500-504, Paul W.Morgan, "Determination of Ethers and Esters of Ethylene Glycol".
Can. J. Res. vol. 25, Sec. B (month unavailable) 1947, pp. 485-489, R.U. Lemieux et al, "Quantitative Estimation as Acetic Acid of Acetyl, Ethylidene, Ethoxy, and α-Hydroxyethyl Groups".

* cited by examiner

*Primary Examiner* — Shaojia Anna Jiang
*Assistant Examiner* — Everett White

(57) ABSTRACT

A description is given of glyoxal-treated polysaccharide derivatives which, to decrease the unbound glyoxal, are treated with an aqueous solution of one or more water-soluble aluminium salts, or one or more water-soluble borates, or a combination of one or more water-soluble aluminium salts and one or more water-soluble borates, and, if appropriate, with suitable buffer substances to set the pH, and then dried. A description is likewise given of a process for decreasing the content of unbound glyoxal in glyoxal-treated polysaccharide derivatives.

1 Claim, No Drawings

WATER-DISPERSIBLE POLYSACCHARIDE DERIVATIVES OF REDUCED GLYOXAL CONTENT, AND A PROCESS FOR DECREASING THE GLYOXAL CONTENT IN GLYOXAL-CROSSLINKED POLYSACCHARIDE DERIVATIVES

CROSS REFERENCE TO RELATED PATENT APPLICATIONS

This application is a divisional application of U.S. application Ser. No. 10/781,230, filed on Feb. 19, 2004 now abandoned, which claimed priority under 35 U.S.C. §119 to German patent application DE 10308109.7, Feb. 26, 2003.

BACKGROUND OF THE INVENTION

1. Field of the Invention

The present invention relates to glyoxal-crosslinked polysaccharide derivatives, for example cellulose ethers, of reduced unbound glyoxal content, and to a method for decreasing the unbound glyoxal in these polysaccharide derivatives.

2. Brief Description of the Prior Art

In a multiplicity of industrial processes involving polysaccharide derivatives, it is necessary to disperse or emulsify a plurality of components in solid or liquid form in the presence of the polysaccharide derivatives.

However, untreated polysaccharide derivatives can only be dissolved, dispersed or emulsified with great effort in many instances, because when the polymer particles are introduced into an aqueous or water-containing solution of the polysaccharide derivatives, a gel layer forms on the surface of these particles. Since water can only penetrate slowly to reach the interior of the polymer, the dissolution, dispersion or emulsification is achieved with great effort. In addition, the resulting swollen particles which are covered with a gel layer have a tendency to agglomerate, and as such lumps are form thereby and the homogeneous distribution of the remaining components is made possible only by means of time- and energy-consuming mixing operations.

Disclosed and contrasted hereunder are the art-related processes of dissolving, dispersing or emulsifying cellulose ethers in a lump-free manner, for example, by treatment with dialdehydes, such as glyoxal. Examples of processes are cited in U.S. Pat. Nos. 2,879,268, 3,297,583, DE-A-1 719 445 and DE-A-1 518 213. Other polysaccharides can likewise be brought into solution following treatment with glyoxal, for example xanthan gum (described in U.S. Pat. No. 4,041,234).

Also disclosed in the literature cited is a process for delaying solubility of cellulose ether by using glyoxal. When sufficiently large amounts of dialdehyde are used, the treated cellulose ether is initially insoluble in water and only dissolves in a lump-free manner after some time. During this time further components can be added, so that after the complete dissolution of the cellulose ether, a homogeneous solution, dispersion or emulsion is present. The dissolution process can be accelerated by increasing the pH ("Cellulose Ethers", chapter 3.2.5, Ullmann's Encyclopedia of Industrial Chemistry, Wiley-VCH Verlag GmbH, Weinheim, Germany).

U.S. Pat. No. 3,356,519, teaches that weak bases, for example, sodium tetraborate are added as additive to glyoxal-crosslinked cellulose ethers to increase the pH of the polymers and thus reduce the time up to complete dissolution of these substances. In contrast with the present invention, the prior art process of accelerating the time for the dissolution, dispersion or emulsion is undesirable and can be suppressed by adding acids. Distinctly, U.S. Pat. No. 3,356,519 teaches that solely cellulose ether powders or cellulose ether granules, are surface-treated with 0.1-0.2% by weight of glyoxal. In contrast, the inventive process relates to water-soluble polymers which are brought to reaction with more than 0.2% by weight of glyoxal. In another contrast with U.S. Pat. No. 3,356,519, the inventively treated polysaccharide derivatives may also be brought into solution in a lump-free manner at the preferred pH in the vicinity of the neutral point. In yet another contrast to U.S. Pat. No. 3,356,519, in the inventive process, the sodium tetraborate is not added in solid form after grinding the cellulose ether. Instead a water-soluble borate in dissolved form is added, preferably before grinding, so that intimate mixing of the methyl cellulose with the water-soluble borate takes place.

Poignantly, according to the teaching of U.S. Pat. No. 3,356,519 (column 2, lines 23-26; Example 1), if sodium tetraborate is added in solid form, no interaction is possible between glyoxal and sodium tetraborate, which interaction is a precondition for achieving the unexpected effects described in this patent.

U.S. Pat. No. 4,400,502 describes contacting anionic water-soluble cellulose ethers with a solution of water, glyoxal and sodium tetraborate in a slurry medium.

U.S. Pat. No. 4,400,502 requires the presence of a non-solvent for the polysaccharide derivative, and a flammable and environmentally harmful organic liquid, which must be removed from the product and reprocessed in a complex manner. In addition, relatively large amounts of sodium tetraborate are required, that is to say at least 50 parts by weight per 100 parts by weight of glyoxal used. It is also of note that this patent does not teach how the procedure is to be followed with alkyl-group-containing polysaccharide derivatives, to reduce the content of unbound glyoxal.

DE-A-2 535 311 describes a process for improving the dispersibility of a cellulose ether in aqueous liquids having a pH greater than 10, by adding boric acid or a water-soluble borate; in addition a dialdehyde, for example glyoxal. Using the process described there, a delayed solubility can also optionally be achieved solely using sodium tetraborate, whereas this is impossible using solely a water-soluble borate or boric acid in the case of the polysaccharide derivatives used according to the present invention. The patent describes treating the cellulose ether with boric acid or sodium tetraborate in a non-acidic, preferably alkaline medium, by setting a pH using one or more additional components. In contrast, by means of the present invention, one can surprisingly achieve a delayed solubility when the cellulose ether is mixed with sodium tetraborate solution containing glyoxal at a neutral pH.

Yet another distinction from the prior art processes is that one cannot infer their effectiveness, as to high retardation of dissolution with low content of unbound glyoxal, on alkyl-group-containing polysaccharide derivatives, which are possibly insoluble in hot water.

As would be realized, like many compounds of the class of dialdehydes, glyoxal, in high amounts, is harmful to health. A reduced content of this compound in cellulose ethers having delayed solubility therefore makes improved handling possible. Furthermore, it would be desirable to keep the unbound glyoxal content in the inventively produced products so low that, in many cases, there would be no requirement to identify these compounds with hazard symbols. As such, the products, because of their thus improved environmental compatibility, can be marketed more successfully. The prior art does not disclose a process for establishing a reduced content of unbound glyoxal in glyoxal-treated polysaccharide derivatives.

It is, therefore, an object of the invention to decrease the content of unbound glyoxal in glyoxal-treated polysaccharide derivatives.

SUMMARY OF THE INVENTION

Surprisingly, it has been found that the content of unbound glyoxal can be decreased by the addition of additives, for example water-soluble borates, so that in the products thus produced, compared with the prior art, significantly less unbound glyoxal is present. These additives consist essentially of water-soluble compounds containing elements of Main Group 3 of the Periodic Table of the Elements. Of this group, water-soluble borates and aluminium salts have proved to be particularly effective. By means of the process of this invention, the content of unbound glyoxal can be markedly lowered compared with the processes obtained according to the prior art. A product which is more environmentally friendly and thus more readily handleable and marketable is thus obtained.

The invention, therefore, relates to glyoxal-treated polysaccharide derivatives, characterized in that, to decrease the unbound glyoxal, they are treated with an aqueous solution of one or more water-soluble aluminium salts, or one or more water-soluble borates, or a combination of one or more water-soluble aluminium salts and one or more water-soluble borates, and, if appropriate, with suitable buffer substances to set the pH, and are dried.

The term "water-soluble borates" for the purposes of this invention means alkali metal salts and ammonium salts of polyboric acids which are characterized by the general formula $H_{n-2}B_nO_{2n-1}$. Preference is given to the use of $Na_2B_4O_7$, $K_2B_4O_7$ and $(NH_4)_2B_4O_7$, which may contain water of crystallization. Salts and esters of orthoboric acid and metaboric acid are less suitable.

A high content of alkyl-derivatized hydroxyl groups of the polysaccharide derivative generally increases the content of unbound extractable glyoxal. The alkylated hydroxyl groups can no longer react with the dialdehyde used for the reversible crosslinking and therefore contribute to increasing the content of unbound extractable glyoxal. Therefore, in the case of alkylated polysaccharide derivatives, there is a particularly great need to decrease the content of unbound glyoxal. The reaction between the dialdehyde glyoxal and the hydroxyl groups of a polysaccharide or polysaccharide derivative is known to those skilled in the art as hemiacetal or acetal formation (F. H. Sangsari, F. Chastrette, M. Chastrette, A. Blanc, G. Mattioda; Recl. Trav. Chim. Pays-Bas 109, page 419). Preference is given to the use of polysaccharide derivatives which bear alkyl substituents on one or more hydroxyl groups. Alkyl substituents are linear, branched or cyclic substituents consisting of the elements carbon and hydrogen. These substituents are bound to an oxygen atom of the polysaccharide either directly or via a number of further atoms or molecular groups. Preferably these substituents contain from one to eighteen carbons. Particularly preferred alkyl substituents are methyl and ethyl. The total degree of substitution of all alkyl substituents is generally greater than 1, preferably between 1 and 2, and particularly preferably between 1.3 and 1.7. If appropriate, other substances can be present, such as carboxymethyl, hydroxyethyl and hydroxypropyl. In a particularly preferred embodiment of the invention, the polysaccharide derivatives are cellulose ethers.

Examples of such cellulose ethers are methyl cellulose, methyl hydroxyethyl cellulose, ethyl hydroxyethyl cellulose, methyl ethyl cellulose, methyl ethyl hydroxyethyl cellulose, methyl hydroxypropyl cellulose, methyl hydroxyethyl hydroxypropyl cellulose, ethyl hydroxyethyl hydroxypropyl cellulose, methyl carboxymethyl cellulose, ethyl carboxymethyl cellulose, propyl cellulose, isopropyl cellulose and cyclohexyl cellulose.

In a further preferred embodiment of this invention, those polysaccharide derivatives are used which are insoluble in boiling water, independently of the type of substituents. One example of such a polysaccharide derivative is hydroxypropyl cellulose.

The amount of unbound glyoxal can be determined by extracting the cellulose ether with a solvent. Suitable solvents dissolve the unbound glyoxal, but not the cellulose ether under test, that is to say for example, toluene, chloroform, dichloromethane, tetrahydrofuran. In the extract, the gyloxal is detected photometrically after a derivatization.

Analytical methods for glyoxal have been described: E. Sawicki, T. R. Hauser and R. Wilson, "A Comparison of Methods for Spot Test Detection and Spectrophotometric Determination of Glyoxal", Analytical Chemistry, Volume 34 (4), [1964], pages 505-508, "Method for the determination of the glyoxal content in cellulose ethers", Cefic, Cellulose ether group, September 2002, dépôt légal D/3158/2002/9.

Photometric analytical methods are known to those skilled in the art and are described in the literature, for example: Lange and Vejdelek, Photometrische Analyse [Photometric Analysis], Verlag Chemie, Weinheim 1980.

In a particularly advantageous embodiment, in addition to glyoxal, with, or separately from, the described additives, one or more buffer substances are added to the polysaccharide derivative, which buffer substances desirably affect the pH. This can avoid too high a pH being set due to a high amount of a basic glyoxal-binding additive. Such a pH leads to an accelerated dissolution of the polysaccharide derivative which is undesirable in many applications. It is likewise possible to avoid molecular weight breakdown and thus viscosity breakdown occurring due to too low a pH.

Furthermore, by setting the pH for crosslinking of the cellulose ether, a technical-grade glyoxal solution can be used which frequently contains portions of glyoxylic acid and thus, without these additives, would lead to viscosity breakdown of the cellulose ethers and thus to a decreased storage stability.

In a preferred embodiment, the buffer substances used are citric acid or salts thereof in combination with water-soluble aluminium salts. In a particularly preferred embodiment, at least one mole of trisodium citrate is used per mole of the water-soluble aluminium salt, so that the aluminium cation is completely complexed in solution and does not interact undesirably with further constituents, for example present in a preparation.

In a further preferred embodiment, the buffer substances used are phosphoric acid or salts thereof in combination with water-soluble borates, to set the desired pH. In principle, suitable compounds are able to elevate or, depending on requirements, decrease the pH of an aqueous solution for the purpose of setting the desired pH.

A further object of the invention is a process for decreasing the unbound glyoxal in glyoxal-treated polysaccharide derivatives.

The inventive process for decreasing the unbound glyoxal in glyoxal-treated polysaccharide derivatives, characterized in that a) the polysaccharide derivative is mixed, preferably at a temperature between 20 and 70° C., with an aqueous solution of one or more water-soluble aluminium salts, or one or more water-soluble borates, or a combination of one or more aluminium salts and one or more water-soluble borates, the solution containing further buffer substances to set the pH, and then b) is dried.

The inventive process therefore consists essentially of adding to the polysaccharide derivative an aqueous solution of glyoxal and an additive consisting essentially of a water-soluble aluminium salt or a water-soluble borate, preferably sodium tetraborate, and also optionally a further component for setting a desired pH. The additive markedly decreases the content of unbound glyoxal that can be extracted. If desired, by means of the third component, which can consist of a mixture of various substances, the pH can be set according to the requirements of the application. In most applications a pH of 8 or more is undesirable, since the retardation of dissolution is then too low to bring the polymer into solution in a lump-free manner. The inventive process can avoid this disadvantage.

Preferably, the glyoxal is used in the form of a 40% strength by weight aqueous solution.

Preferably, in addition to the glyoxal in the form of a 40% strength by weight aqueous solution, one or more water-soluble borates and one or more substances for setting the pH are dissolved in water and then added to the polysaccharide derivative.

A water-moist filter cake obtained after hot water washing preferably has a dry matter content of 40-60% is used. This filter cake is preferably sprayed with a solution of glyoxal, water-soluble borate and buffer substance and, if appropriate, water, while it is maintained in motion and then dried and ground or subjected to a grinder-drying.

In a further preferred embodiment, the filter cake is sprayed with a solution of glyoxal, water-soluble aluminium salt and buffer substance and also, if appropriate, water.

The amount of glyoxal added to the filter cake is preferably at least 0.4 percent by weight, based on the mass of the dried and ground polysaccharide derivative, particularly preferably between 0.4 and 1 percent by weight.

The amount of water-soluble tetraborate or water-soluble aluminium salt, based on the dry substances, is preferably less than 0.5 part by weight per part by weight of glyoxal, particularly preferably between 0.1 and 0.3 part by weight per part by weight of glyoxal.

The retardation of dissolution can be determined using a rheometer which is able to measure the shear stress as a function of time. The measurement starts with sprinkling the cellulose ether into the water which has been charged. The measured values thus obtained are entered onto a diagram, so that an S-shaped curve is produced which reproduces the shear stress as a function of time. A tangent is drawn to the point of inflection of the curve, the intersection of which tangent with the time axis (x axis) gives the retardation of dissolution.

EXAMPLES

The viscosities were determined at a temperature of 20° C. on a 2% by weight solution of the treated air-dried polysaccharide derivative in distilled water. The measuring instrument used was a Rotovisko VT 550, manufacturer: Haake, equipped with an MVII rotor and a MV measuring cup from the same manufacturer. The shear gradient was 2.55 $s^{-1}$.

The pH reported was determined electrometrically using a single-rod electrode on a 2% by weight solution of the treated air-dried polysaccharide derivative in distilled water.

Glyoxal was used in the form of a 40% strength aqueous solution.

To measure the unbound glyoxal, 200 mg of air-dried, ground and dried cellulose ether were extracted over the course of four hours in an overhead mixer at a low speed of rotation in an injection flask containing 10 ml of tetrahydrofuran. The resultant extract, after derivatization with para-nitrophenylhydrazine under basic conditions, as described in E. Sawicki, T. R. Hauser and R. Wilson, "A Comparison of Methods for Spot Test Detection and Spectrophotometric Determination of Glyoxal", Analytical Chemistry, Volume 34 (4), [1964], pages 505-508, was used for photometric analysis of the glyoxal.

DS (M) gives the average degree of substitution of an anhydroglucose unit by methyl substituents. Substitution by reagents which form a further hydroxyl group is characterized by the molar degree of substitution (MS). MS(HE) gives the average number of hydroxyethyl groups per anhydroglucose unit and can be greater than three, since more than three hydroxyethyl groups can be bound to each anhydroglucose unit.

DS and MS are determined by the Zeisel method known to those skilled in the art described, for example, in P. W. Morgan, *Ind. Eng. Chem. Anal. Ed.* 18 (1946) 500-504 and R. U. Lemieux, C. B. Purves, *Can. J Res. Sect. B* 25 (1947) 485-489.

The reported dissolution retardations were measured using a Haake rheometer (VT 550) at 23° C. in aqueous solution, pH 6.6.

The amounts of MHEC, aluminium sulphate, magnesium sulphate, citric acid, sodium tetraborate, disodium hydrogenphosphate and sodium dihydrogenphosphate specified in the examples are based on anhydrous dry substance. Use was made of water-moist methyl hydroxyethyl cellulose [MHEC] having a dry matter content of 45-55%, aluminium sulphate hexadecahydrate [$Al_2(SO_4)_3.16H_2O$], magnesium sulphate heptahydrate [$Mg(SO_4).7H_2O$], citric acid monohydrate, sodium tetraborate decahydrate [$Na_2B_4O_7.10H_2O$], disodium hydrogenphosphate dihydrate [$Na_2HPO_4.2H_2O$] and sodium dihydrogenphosphate dihydrate [$NaH_2PO_4.2H_2O$]. Glyoxal was used as aqueous solution with a glyoxal content of 40 percent by weight.

Unless stated otherwise, figures relate to percentages by weight of the total amount.

Example 1

Water-moist methyl hydroxyethyl cellulose (2 500 g of dry matter), characterized by an average degree of substitution DS (M) of 1.76 (average number of methyl groups per anhydroglucose unit), and a molar degree of substitution MS (HE) of 0.32 (average number of hydroxyethyl groups per anhydroglucose unit), viscosity 39 000 mPa·s (2% strength solution in water) is placed in a mixer and mixed there with an aqueous solution of glyoxal, water and aluminium sulphate. The solution additionally contains a citrate buffer prepared from citric acid and sodium hydroxide solution. After adding the reagents, the mixture is mixed over the course of 90 min at an internal temperature of 55° C.

The moist MHEC is then dried in a circulated-air drying cabinet at 55° C. and ground in a laboratory screen-basket grinder having a screen insert of mesh width 500 μm.

|  |  | Experiment No. | | | |
| --- | --- | --- | --- | --- | --- |
|  |  | 1A (comparison) | 1B | 1C | 1D |
| MHEC | g | 2 500 | 2 500 | 2 500 | 2 500 |
| Water | g | 241.4 | 239.3 | 299.5 | 297.4 |
| Glyoxal solution (40% by weight in water) | ml | 55 | 55 | 55 | 55 |
| Aluminium sulphate | g | — | 2.5 | 5.0 | 7.5 |
| Citric acid | g | — | 1.41 | 2.81 | 4.22 |
| NaOH (1N) | ml | 1.6 | 47.6 | 92.8 | 145.4 |
| Dissolution retardation | min | 21 | 20.5 | 20.5 | 17.5 |
| Glyoxal, unbound | % by weight | 0.13 | 0.13 | 0.11 | 0.09 |
| pH |  | 5.5 | 4.8 | 4.6 | 3.6 |

Example 2

Water-moist methyl hydroxyethyl cellulose (200 g of dry matter), characterized by DS (methyl)=1.78 and MS (hydroxyethyl)=0.42, viscosity 3 500 mPa·s (2% strength solution in water), is mixed with water, glyoxal and either I) sodium dihydrogenphosphate, or II) sodium dihydrogenphosphate and sodium tetraborate in a commercially conventional Bosch kitchen machine type UM4EV2B; the stirrer tool used is a kneading hook delivered with the machine. The mixing time is 45 minutes. The moist MHEC is then dried in a circulated-air drying cabinet at 55° C. and ground in a laboratory screen-basket mill having a screen insert of mesh width 500 μm.

|  |  | Experiment | | | |
| --- | --- | --- | --- | --- | --- |
|  |  | 2A (comparison) | 2B | 2C (comparison) | 2D |
| MHEC | g | 200 | 200 | 200 | 200 |
| Water | g | 10.2 | 9.7 | 9.3 | 8.8 |
| Sodium tetraborate | g | 0 | 0.6 | 0 | 0.6 |
| NaH$_2$PO$_4$ | g | 1.2 | 1.2 | 1.2 | 1.2 |
| Glyoxal solution (40% strength in water) | ml | 4.4 | 4.4 | 5.6 | 5.6 |
| Glyoxal, unbound | % by weight | 0.17 | 0.12 | 0.23 | 0.16 |
| Dissolution retardation | min | 15.5 | 12.5 | 17 | 15 |
| pH |  | 5.8 | 7.7 | 5.5 | 7.7 |

Example 3

Water-moist methyl hydroxyethyl cellulose (200 g of dry matter), characterized by DS (methyl)=1.76 and MS (hydroxyethyl)=0.32, viscosity 680 mPa·s (2% strength solution in water), is treated as described in Example 2 with water, glyoxal and either I) sodium dihydrogenphosphate and sodium tetraborate or II) sodium dihydrogenphosphate (comparison sample), dried and ground.

|  |  | Batch No.: | |
| --- | --- | --- | --- |
|  |  | 3A | 3B (comparison) |
| MHEC | g | 200 | 200 |
| Water | g | 23.7 | 24.3 |
| Sodium tetraborate | g | 0.6 | — |
| NaH$_2$PO$_4$ | g | 1.2 | 1.2 |
| Glyoxal (40% by weight in water) | ml | 5.6 | 5.6 |
| Dissolution retardation | min | 13 | 10.5 |
| Glyoxal, Unbound | % by weight | 0.13 | 0.22 |
| pH |  | 7.6 | 6.0 |

Example 4

Methyl hydroxyethyl cellulose (200 g of dry matter), characterized by DS (methyl)=1.75 and MS (hydroxyethyl)=0.32, viscosity 15 000 mPa·s (2% strength solution in water), is treated with water, glyoxal and either I) sodium dihydrogenphosphate and sodium tetraborate, or II) no inventive additives, as described in Example 2, dried and ground.

|  |  | Batch No.: | |
| --- | --- | --- | --- |
|  |  | 4A | 4B (comparison) |
| MHEC | g | 200 | 200 |
| Water | g | 32.9 | 33.4 |
| Disodium tetraborate | g | 0.6 | — |
| NaH$_2$PO$_4$ | g | 0.6 | — |
| Glyoxal (40% by weight in water) | ml | 4.4 | 4.4 |
| Dissolution retardation | min | 12.5 | 14 |
| Glyoxal, unbound | % by weight | 0.07 | 0.19 |
| pH |  | 8.1 | 5.3 |

Example 5

Methyl hydroxyethyl cellulose (2 500 g of dry matter), characterized by DS (methyl) of 1.57 and MS (HE) of 0.27, viscosity 30 000 mPa·s (2% strength solution in water) is placed in a mixer and mixed there with water, a buffer mixture consisting of sodium dihydrogenphosphate and disodium hydrogenphosphate and also I) glyoxal, II) glyoxal and sodium tetraborate or III) sodium tetraborate. After the reagents are added the mixture is mixed over the course of 90 min at an internal temperature of 55° C.

The moist MHEC is then dried in a circulated-air drying cabinet at 55° C. and ground in a laboratory screening-basket mill using a screen insert of mesh width 500 μm.

|  |  | Batch No. | | |
|---|---|---|---|---|
|  |  | 5A (comparison) | 5B | 5C (comparison) |
| MHEC | g | 2 500 | 2 500 | 2 500 |
| Water | g | 420.7 | 414.0 | 455.9 |
| Glyoxal (40% strength solution in water) | ml | 55 | 55 | — |
| $Na_2HPO_4$ | g | 4.1 | 4.1 | 4.1 |
| $NaH_2PO_4$ | g | 3.4 | 3.4 | 3.4 |
| Sodium tetraborate | g | — | 7.5 | 7.5 |
| Dissolution retardation | min | 18 | 15 | — (forms lumps immediately) |
| Glyoxal, unbound | % by weight | 0.08 | 0.05 | — |
| pH |  | 6.6 | 8.2 | 8.8 |

Example 6

Methyl hydroxyethyl cellulose (2 500 g of dry matter), characterized by DS (methyl)=1.75 and MS (hydroxyethyl)= 0.32, viscosity 20 000 mPa·s (2% strength solution in water), is mixed with water, a buffer mixture consisting of sodium dihydrogenphosphate and disodium hydrogenphosphate and also I) no additional additive II) boric acid or III) sodium tetraborate, as described in Example 5, dried and ground. For comparison, a further sample without glyoxal, that is to say only with boric acid and a buffer mixture consisting of sodium dihydrogenphosphate and disodium hydrogenphosphate was sprayed and dried.

|  |  | Experiment | | | |
|---|---|---|---|---|---|
|  |  | 6A (comparison) | 6B (comparison) | 6C | 6D (comparison) |
| MHEC | g | 200 | 200 | 200 | 200 |
| Glyoxal (40% by weight in water) | ml | 4.4 | 4.4 | 4.4 | — |
| Additive |  | — | boric acid | sodium tetraborate | boric acid |
| Amount of additive | g | 0 | 0.6 | 0.6 | 0.6 |
| $Na_2HPO_4$ | g | 0.328 | 0.328 | 0.328 | 0.328 |
| $NaH_2PO_4$ | g | 0.272 | 0.272 | 0.272 | 0.272 |
| Dissolution retardation | min | 21.5 | 20.5 | 15.6 | — (forms lumps immediately) |
| Glyoxal, unbound | % by weight | 0.16 | 0.15 | 0.10 | — |
| pH |  | 6.6 | 7.2 | 8.3 | 7.4 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing glyoxal-treated polysaccharide derivatives comprising:
    a) mixing an untreated polysaccharide derivative that is selected from the group consisting of methyl cellulose, methyl hydroxyethyl cellulose, ethyl hydroxyethyl cellulose, methyl ethyl cellulose, methyl ethyl hydroxyethyl cellulose, methyl hydroxypropyl cellulose, methyl hydroxyethyl hydroxypropyl cellulose, ethyl hydroxyethyl hydroxypropyl cellulose, methyl carboxymethyl cellulose, ethyl carboxymethyl cellulose, propyl cellulose, isopropyl cellulose, and cyclohexyl cellulose in the form of particles with
        i) an aqueous solution of glyoxal,
        ii) water-soluble borates in an amount less than 0.5 part by weight per part by weight of glyoxal, and
        iii) salts of phosphoric acid as a buffer substance for adjusting the pH value, said mixing being conducted at a temperature of between 20 and 70° C., and
    b) drying the resultant mixture, wherein the amount of extractable, unbound glyoxal is less than 0.1% by weight.

* * * * *